United States Patent [19]

Hsu

[11] Patent Number: 5,064,528

[45] Date of Patent: Nov. 12, 1991

[54] MULTIPLE HOUSING FILTER SYSTEM

[76] Inventor: Yun-Tung Hsu, No. 9, Floor 2, Alley 2, Lane 437, Nei-Hu Road, Sec. 1, Nei-Hu Dist., Taipei, Taiwan

[21] Appl. No.: 481,419

[22] Filed: Feb. 15, 1990

[51] Int. Cl.$^5$ .............................................. B01D 29/11
[52] U.S. Cl. ............................... 210/8.5; 210/323.2; 210/335; 210/416.2; 210/435; 210/497.01; 119/3; 119/5
[58] Field of Search ................... 210/232, 323.2, 335, 210/416.1, 435, 497.01, 85; 119/3, 5

[56] References Cited

U.S. PATENT DOCUMENTS 3,891,555 6/1975 Bennett et al. ....................... 210/169

Primary Examiner—Robert A. Dawson
Assistant Examiner—David Reifsnyder
Attorney, Agent, or Firm—Townsend and Townsend

[57] ABSTRACT

A filter includes a front receiving dish, a rear receiving dish and several removably interconnected intermediate receiving dishes removably interconnecting the front and rear receiving dishes. Several filter units are respectively and removably mounted on the front and intermediate receiving dishes and accommodated in a water conduit unit. A water suction tube is communicated with the intake opening in the upper portion of the water conduit unit, while a drain tube is communicated with the drainage opening in the bottom of the water conduit unit at a level below the intake opening. A pump may be mounted on the front receiving dish so as to force water into the water conduit unit through the water suction tube.

10 Claims, 5 Drawing Sheets

MULTIPLE HOUSING FILTER SYSTEM

BACKGROUND OF THE INVENTION

This invention relates to a filter, more particularly to a filter for a breeding tank, such as a fish breeding tank.

In this art, filters of different constructions are used depending on the size of breeding tanks. It is time-consuming to simultaneously manufacture filters of different constructions. Furthermore, huge filters are difficult to carry and have a complex structure which is expensive to manufacture.

SUMMARY OF THE INVENTION

An object of this invention is to provide a compact filter which can be easily manufactured depending on the size of the associated breeding tank.

Another object of this invention is to provide an inexpensive filter which is disposable.

According to this invention, a filter includes a front receiving dish adapted to allow for mounting of a pump thereon, a rear receiving dish, and intermediate receiving dish means which can include a series of removably interconnected intermediate receiving dishes removably interconnecting said front and rear receiving dishes. A plurality of interconnected filter units are respectively and removably mounted on the intermediate receiving dishes. Each of the filter units includes a tubular filter housing impermeable to water, and a filter element accommodated within said filter housing.

All of the filter housings together constitute a water conduit between said front and rear receiving dishes. The water conduit has an open front end and an open rear end. An impermeable front cylinder is mounted removably on the front receiving dish and has a closed front end, an open rear end connected securely to said front end of said water conduit, and an intake opening formed in an upper portion of said front cylinder. The front cylinder includes a filter element accommodated therein. An impermeable rear cylinder is mounted removably on the rear receiving dish and has an open front end connected securely to the rear end of the water conduit, a closed rear end, and a drainage opening formed in the bottom surface of said rear cylinder at a level below that of the intake opening. A water suction tube is communicated with the intake opening. The pump forces water into the front cylinder through the water suction tube. A drain tube is communicated with the drainage opening of the rear cylinder. In a case where the filter is used in a breeding tank, the number of the intermediate receiving dishes and the filter units can be varied depending on the size of the breeding tank. The filter units are preferably made of a soft plastic which is inexpensive.

BRIEF DESCRIPTION OF THE DRAWING

Other features and advantages of this invention will become apparent in the following detailed description of the preferred embodiments of this invention, with reference to the accompanying drawings, in which.

DETAILED DESCRIPTION OF THE PREFERRED EMBODIMENTS

Figure 1:
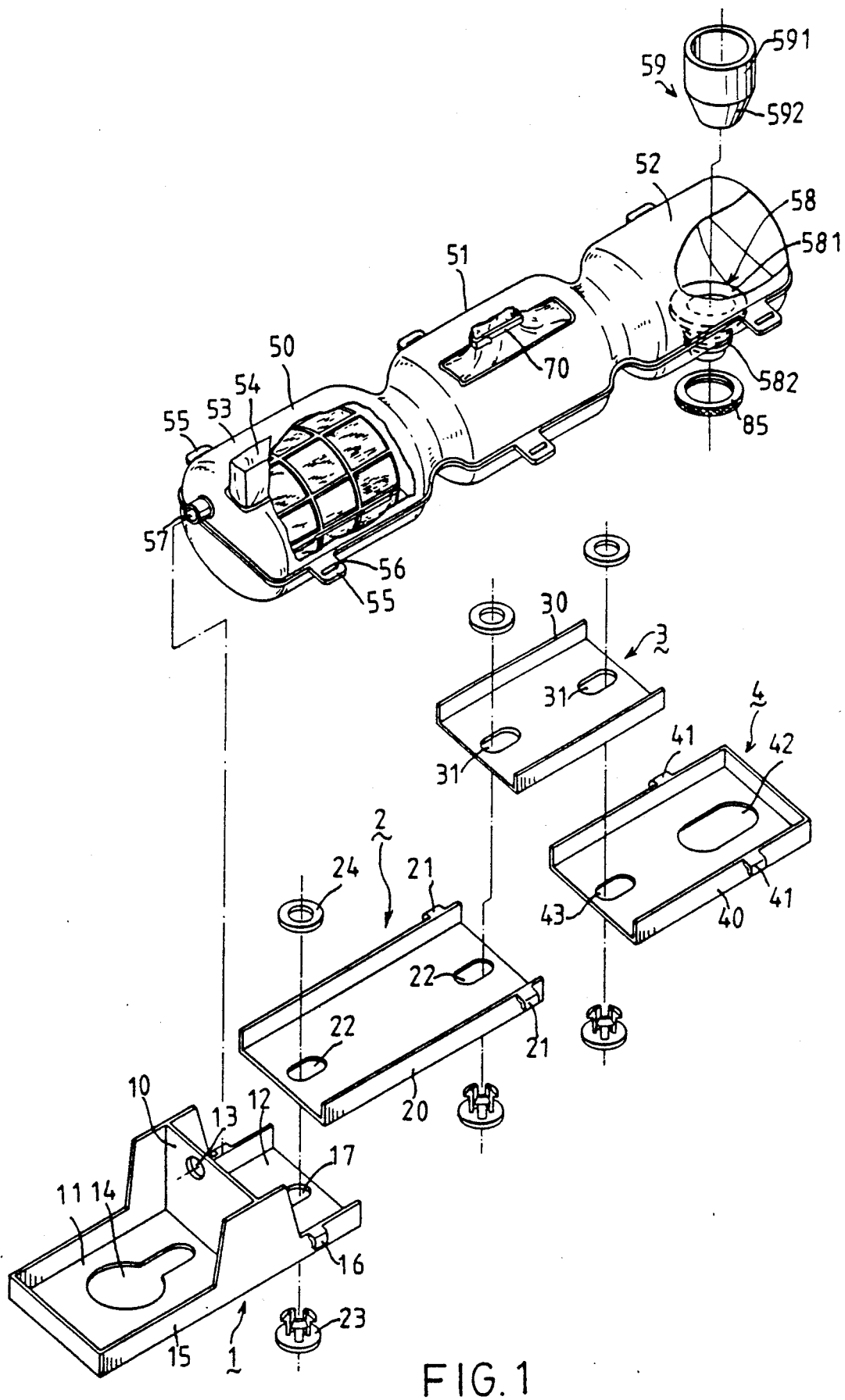
FIG. 1 is a partially exploded view of a filter according to this invention.

Referring to FIG. 1, the mounting assembly of a filter of this invention includes a front receiving dish 1, a first intermediate receiving dish 2, a second intermediate receiving dish 3, a rear receiving dish 4 and a filter device 5.

The front receiving dish 1 includes a partition 10 fixed on the bottom wall thereof defining a front portion 11 and a rear portion 12. The partition 10 has a circular hole 13 formed therethrough. The front portion 11 includes a mounting hole 14 formed through the bottom wall thereof, and a vertical peripheral wall 15 provided along the periphery of the bottom wall of the front receiving dish 1 except for the rear side of the front receiving dish 1. Two inverted L-shaped tongues 16 are provided on two sides of the peripheral wall 15 of the front receiving dish 1. A retaining hole 17 is formed through the bottom wall of the rear portion 12 of the front receiving dish 1.

The first intermediate receiving dish 2 is of a U-shaped cross-section and has a bottom wall, and two lengthwise extending side walls 20 provided on two sides of the bottom wall thereof. Similarly, the second intermediate receiving dish 3 has a bottom wall, and two lengthwise extending side walls 30. Two inverted L-shaped tongues 21 are provided on the side walls 20 of the first intermediate receiving dish 2. The first intermediate receiving dish 2 has two retaining holes 22 respectively formed through the front and rear portions thereof, while the second intermediate receiving dish 3 has another two retaining holes 31 respectively formed through the front and rear portions thereof. The front portion of the first intermediate receiving dish 2 is placed on the rear portion 12 of the front receiving dish 1 in such a manner that the retaining hole 17 of the front receiving dish 1 registers with the front retaining hole 22 of the first intermediate receiving dish 2, while the front portion of the second receiving dish 3 is placed on the rear portion of the first receiving dish 2 in such a manner that the rear retaining hole 22 of the first intermediate receiving dish 2 registers with the front retaining hole 31 of the second intermediate receiving dish 3.

The rear receiving dish 4 has a bottom wall and a U-shaped peripheral wall 40 provided therealong except for the front side thereof. Two inverted L-shaped tongues 41 are provided on two sides of the peripheral wall 40. A large hole 42 is formed through the rear portion of the bottom wall of the rear receiving dish 4, while a retaining hole 43 is formed through the front portion of the bottom wall of the rear receiving dish 4. The rear portion of the second intermediate receiving dish 3 is placed on the front portion of the rear receiving dish 4 in such a manner that the rear retaining hole 31 of the second intermediate receiving dish 3 registers with the retaining hole 43 of the rear receiving dish 4. Any adjacent two of the receiving dishes 1, 2, 3, 4 are interconnected removably by means of a resilient fastener 23 and a retaining ring 24. Each of the fasteners 23 is passed through two retaining holes (17 and 22, 22 and 31, 31 and 43). Each of the retaining rings 24 is sleeved on the corresponding fastener 23. As illustrated, each of the fasteners 23 includes a circular base plate and three equally-spaced barbs projecting from the upper surface of the base plate. In this embodiment, all of the front receiving dish 1, the first intermediate receiving dish 2, the second intermediate receiving dish 3, the rear receiving dish 4, the fasteners 23 and the retaining rings 24 are made of plastic.

The filter device 5 includes a front cylinder unit 50, a tubular filter housing 51 and a rear cylinder unit 52. The front cylinder unit 50 includes a front cylinder 53 made of a soft plastic impermeable to water. The front cylinder 53 consists of an upper half and a lower half which are heat sealed together. A rectangular tubular projection 54 is provided on the top of the front cylinder 53 and has a central hole communicated with the interior of the front cylinder 53. Two lugs 55 are provided on two sides of the front cylinder 53 and have holes 56 formed therethrough. The L-shaped tongues 16 of the front receiving dish 1 are engaged with the holes 56 in the lugs 55 of the front cylinder 53 so as to removably mount the front cylinder 53 on the front receiving dish 5. A water suction tube 57 is communicated with the intake opening in the upper portion of the front cylinder 53.

Figure 2:
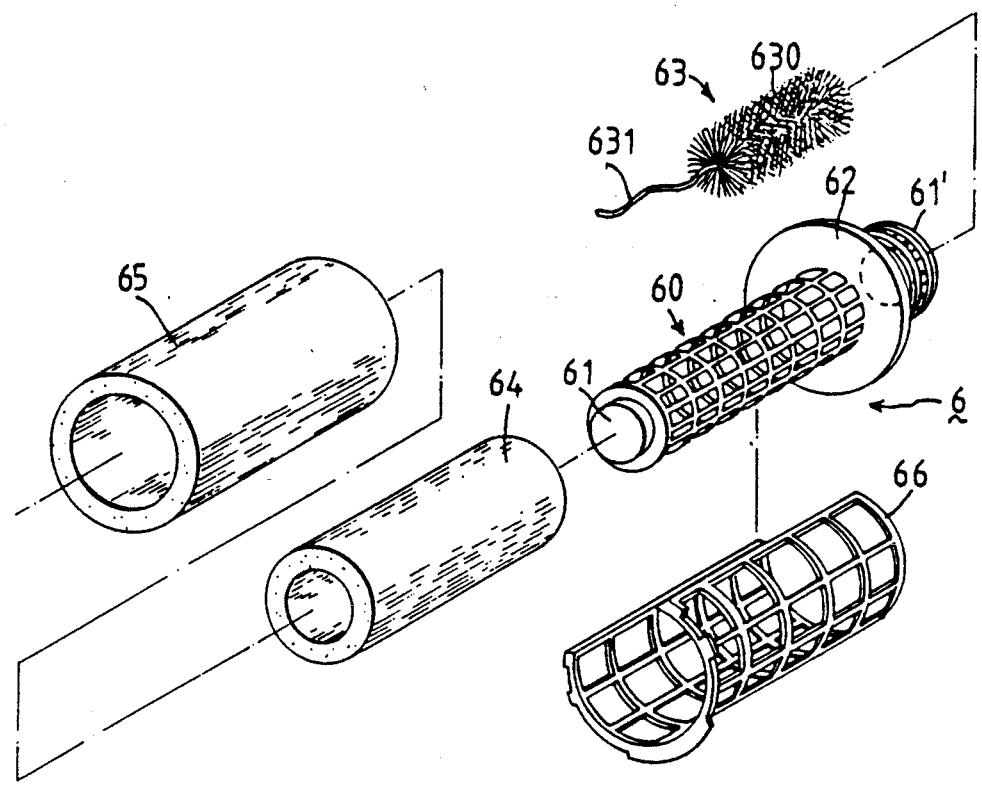
FIG. 2 is an exploded view showing the filter unit of the filter according to this invention.
Figure 3:
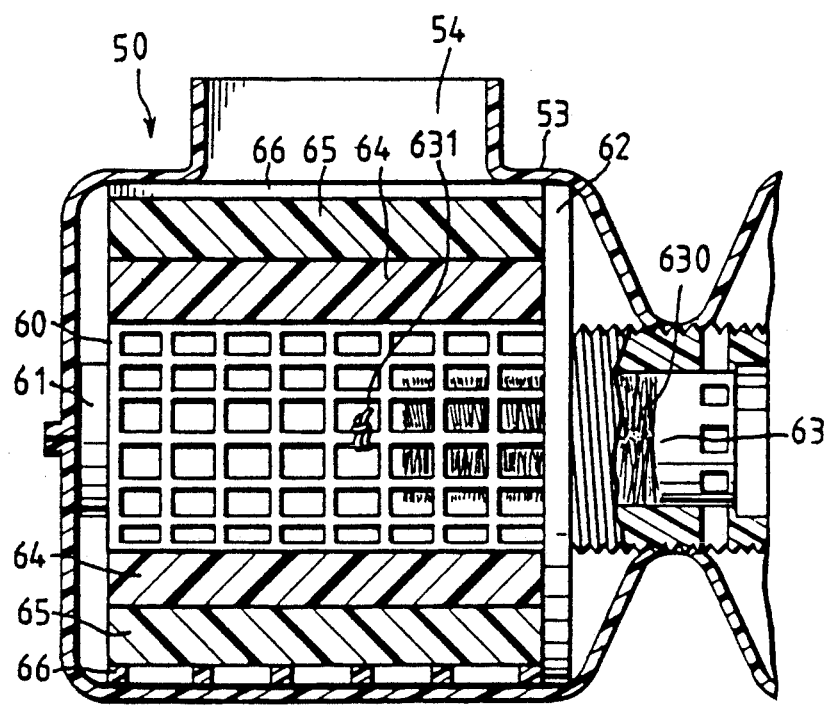
FIG. 3 is a sectional view showing the filter unit of the filter according to this invention.
Figure 4:
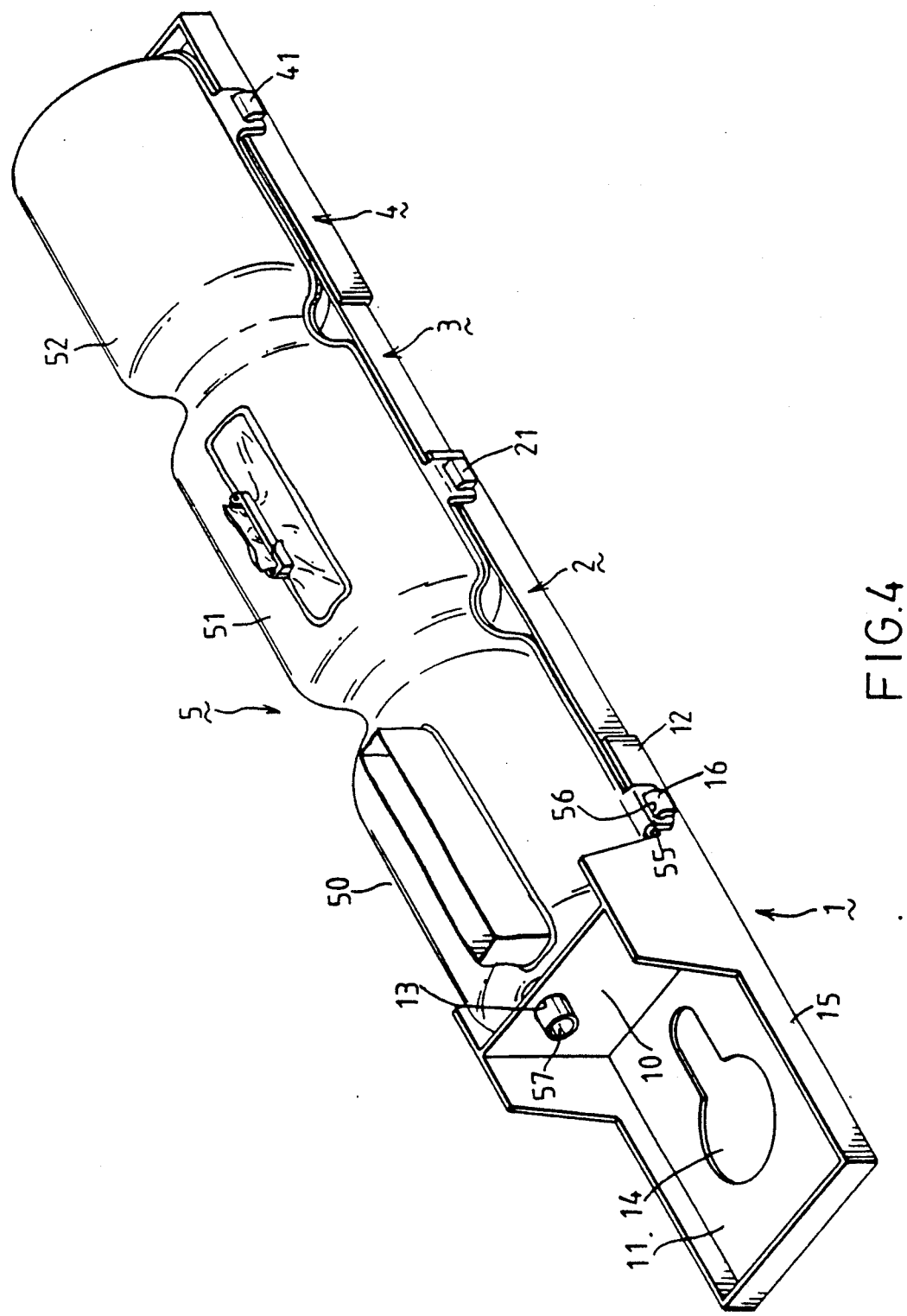
FIG. 4 is an assembled perspective view showing the filter of this invention.

Referring to FIGS. 1 to 3, a filter assembly 6 and either the front cylinder 53 or the filter housing 51 together constitute a filter unit. As illustrated, the filter assembly 6 includes a generally cylindrical inner filter net 60 made of a soft plastic. The inner filter net 60 includes an insertion portion 61, a sleeve portion 61' with an inner diameter slightly greater than the outer diameter of the insertion portion 61, and an outward flange 62 provided on the rear end portion of the inner filter net 60. A bristled member 63 is disposed within the inner filter net 60 and includes a core, a plurality of bristles 630 evenly distributed on the core, and a fastening cord 631 attached to an end of the core. The filter assembly 6 further includes a tubular inner filter element 64 sleeved on the left portion of the inner filter net 60, a tubular outer filter element 65 sleeved on the inner filter element 64, and an outer filter net 66 with a generally semicircular cross-section clamping the outer filter element 65 between two sides thereof. The fastening cord 631 is fastened to the inner filter net 60. The inner filter element 64 and the outer filter element 65 are made of a filter material, such as cotton, while the inner filter net 60 and the outer filter net 66 are made of a plastic so as to support the inner filter element 64 and the outer filter element 65 therebetween, thereby maintaining the filter elements 64, 65 in the form of a circular tube. The filter assembly 6 is placed into the inner cylinder 53 through the central hole of the projection 54 by enlarging forcibly the central hole of the projection 54 and pressing two sides of the outer filter net 66 against each other. Then, a clip 70 clasps and seals the projection 54. For convenience in illustration, the clip 70 provided on the projection 54 of the front cylinder 53 is not shown in FIGS. 1 and 4. The filter housing 51 also consists of an upper half and a lower half which are heat sealed together. Another filter assembly 6 is placed into the filter housing 51 in the same manner as the filter assembly 6 in the front cylinder 53.

In assembly, the insertion portion 61 of the inner filter net 60 in the filter housing 51 is engaged within the sleeve portion 61' of the inner filter net 60 in the front cylinder 50.

The rear cylinder unit 52 includes a rear cylinder consisting of an upper half and a lower half which are heat sealed together, and a drainage opening formed through the bottom of the rear cylinder. Before heat sealing between the upper half and the lower half of the rear cylinder, a positioning sleeve 58 is inserted downward into the drainage opening in such a manner that the upper end flange 581 of the positioning sleeve 58 abuts against the inner wall of the rear cylinder. Then, a nut 85 is engaged with the externally threaded lower portion 582 of the positioning sleeve 58 so as to secure the positioning sleeve 58 to the rear cylinder. Finally, a drain tube 59 is inserted into the central bore of the positioning sleeve 58 in such a manner that the cylindrical upper portion 591 of the drain tube 59 is inserted tightly into the positioning sleeve 58. The drain tube 59 has a conical lower portion 592 which enables the drain tube 59 to easily pass through the positioning sleeve 58. Any adjacent two of the front cylinder 53, the filter housing 51 and the rear cylinder of the rear cylinder unit 52 are joined together by heat sealing technique.

Figure 5:
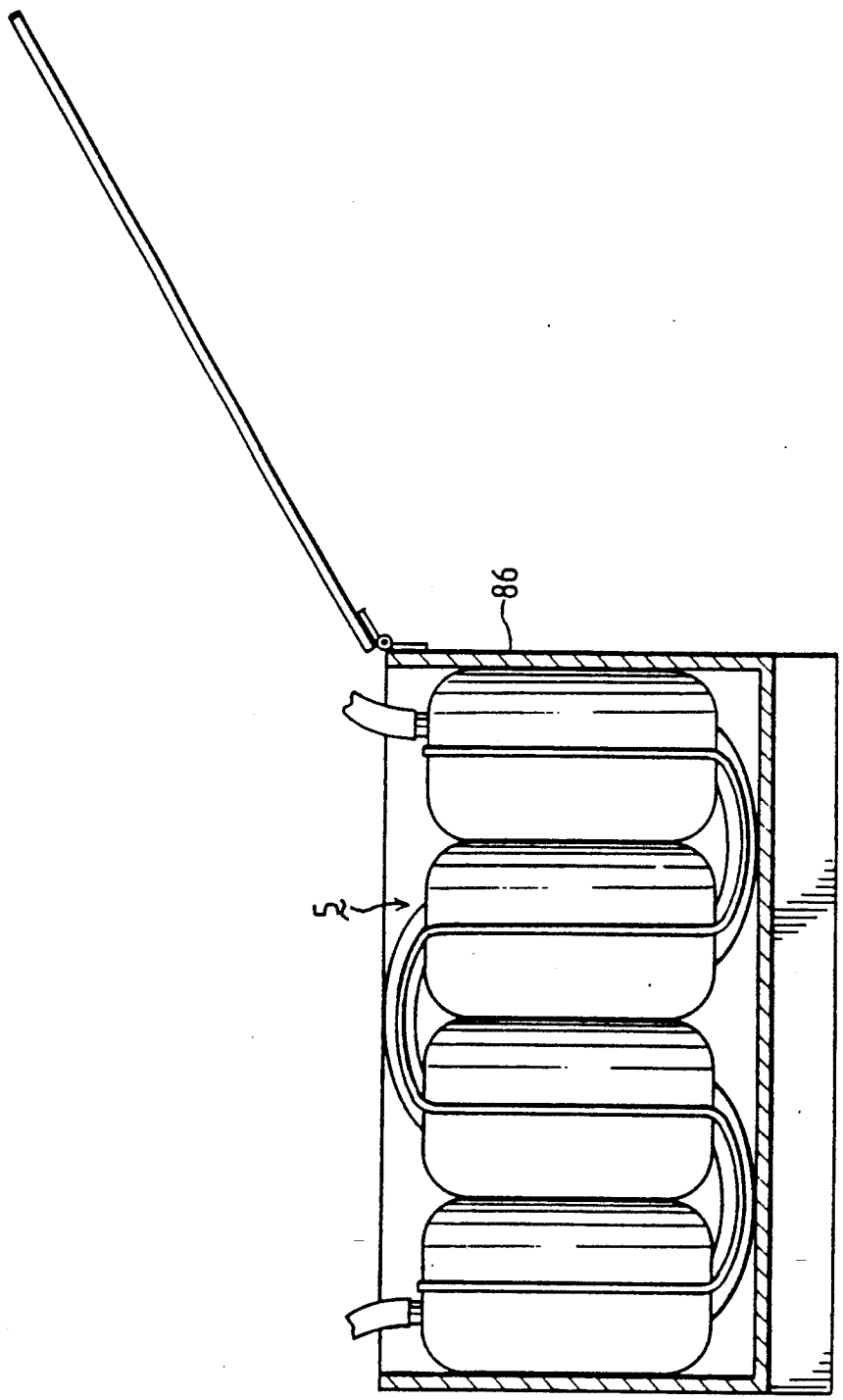
FIG. 5 is a schematic view illustrating the filter device of the filter, which is folded in a case.

Referring to FIG. 5, because all of the front cylinder 53, the filter housing 51 and the rear cylinder of the rear cylinder unit 52 are made of a soft plastic, the filter device 5 can be folded into a compact unit and placed into a case 86. Accordingly, the filter device 5 and the mounting assembly 1, 2, 3, 4 can be transported separately and assembled when necessary. A pump (not shown) is mounted within the mounting hole 14 of the front receiving dish 1 so as to force water into the front cylinder 53 through the water suction tube 57.

Figure 6:
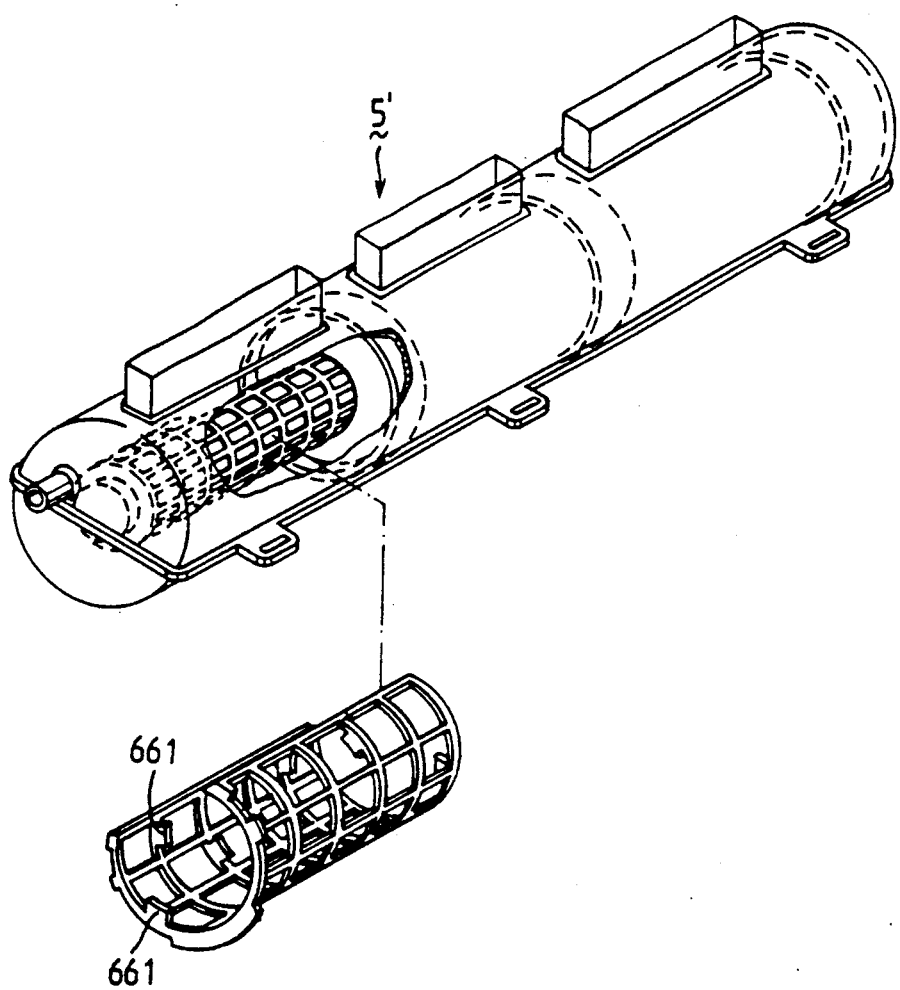
FIG. 6 is a schematic view illustrating another embodiment of this invention.

Referring to FIG. 6, a plurality of retaining tongues 661 are provided on the inner wall of the outer filter net 66 and press against the outer surface of the outer filter element 65 so as to prevent the outer filter element 65 from movement relative to the outer filter net 66. In this embodiment, the connecting portions between the front cylinder unit 50 and the filter housing 51 and between the filter housing 51 and the rear cylinder unit 52 are enlarged so that the filter device 5' forms a cylinder, thereby improving the outer appearance of the filter device 5'.

With this invention thus explained, it is apparent that numerous modifications and variations can be made without departing from the scope and spirit of this invention. It is therefore intended that this invention be limited only as indicated in the appended claims.

I claim:
1. A filter system comprising:
   a front cylinder, formed of material impermeable to water, having:
   i) a first end;
   ii) a second end having an outlet;
   iii) an intake opening located on said first end of said front cylinder; and
   iv) a first filter element contained within;
   a tubular filter housing, having a second filter said tubular housing being impermeable to water and having an inlet end, coupled to said second end of said front cylinder, and an outlet end;
   a rear cylinder, formed of a material impermeable to water, and having:
   i) a first end having an inlet coupled to said outlet end of said tubular housing;
   ii) a second end; and
   iii) a drainage opening formed in a side surface of said rear cylinder and located at a level below a level of said intake opening;

a front receiving dish adapted to allow for mounting of a pump thereon and for mounting said front cylinder;

a rear receiving dish for mounting said rear cylinder;

intermediate receiving dish means for mounting said tubular filter housing and for interconnecting said front receiving dish and said rear receiving dish;

a drain tube coupled to said drainage opening; and a water suction tube coupled to said intake opening wherein said pump forces water into said front cylinder though said water suction tube.

2. A filter system as claimed in claim 1, wherein: said second filter element is shaped in the form of a circular tube and made of a filtering material; and said tubular filter housing includes a tubular plastic inner filter net disposed within said second filter element, a plastic outer filter net of a generally semicircular cross-section sleeved on said second filter element, and a bristled member disposed within said inner filter net, wherein association of said inner filter net with said outer filter net maintains said second filter element in the form of said circular tube.

3. A filter system as claimed in claim 2, wherein said tubular filter housing comprises: a circular tube made of a soft plastic; a rectangular tubular projection provided on a side wall of said circular tube; a clip clasping and sealing said projection; wherein said projection has a central hole which is communicated with an interior of said tubular filter housing; and wherein said central hole is sized so that said inner filter net, said second filter element, said outer filter net and said bristled member can be placed forcibly into said tubular filter housing through said central hole of said projection.

4. A filter system as claimed in claim 2, wherein said second filter element is made of cotton; and said outer filter net includes a plurality of retaining tongues protruding from an inner wall thereof to press against an outer surface of said second filter element so as to prevent said second filter element from movement thereto.

5. A filter system as claimed in claim 4, wherein: said first filter element is shaped in the form of a circular tube and made of a filtering material; and said first filter element further includes a tubular plastic inner filter net disposed within said first filter element, a plastic outer filter net of a generally semicircular cross-section sleeved on said first filter element, and a bristled member disposed within said inner filter net, wherein association of said inner filter net with said outer filter net maintains said filter element in the form of said circular tube.

6. A filter system as claimed in claim 5, wherein said front cylinder further comprises: a cylinder made of a soft plastic; a rectangular tubular projection provided on a side wall of said cylinder; a clip clasping and sealing said projection; wherein said projection has a central hole which is communicated with an interior of said cylinder; and wherein said central hole is sized so that said inner filter net, said first filter element, said outer filter net and said bristled member can be placed forcibly into said cylinder through said central hole of said projection.

7. A filter system as claimed in claim 5, wherein said first filter element is made of cotton; and said outer filter net includes a plurality of retaining tongues protruding from an inner wall thereof to press against an outer surface of said first filter element so as to prevent said first filter element from movement thereto.

8. The filter system of claim 5 wherein said tubular filter housing is removably mounted on said intermediate receiving dish.

9. The filter system of claim 1 wherein said front cylinder is removably mounted on said front dish.

10. The filter system of claim 1 wherein said rear cylinder is removably mounted on said rear receiving dish.

* * * * *